UNITED STATES PATENT OFFICE.

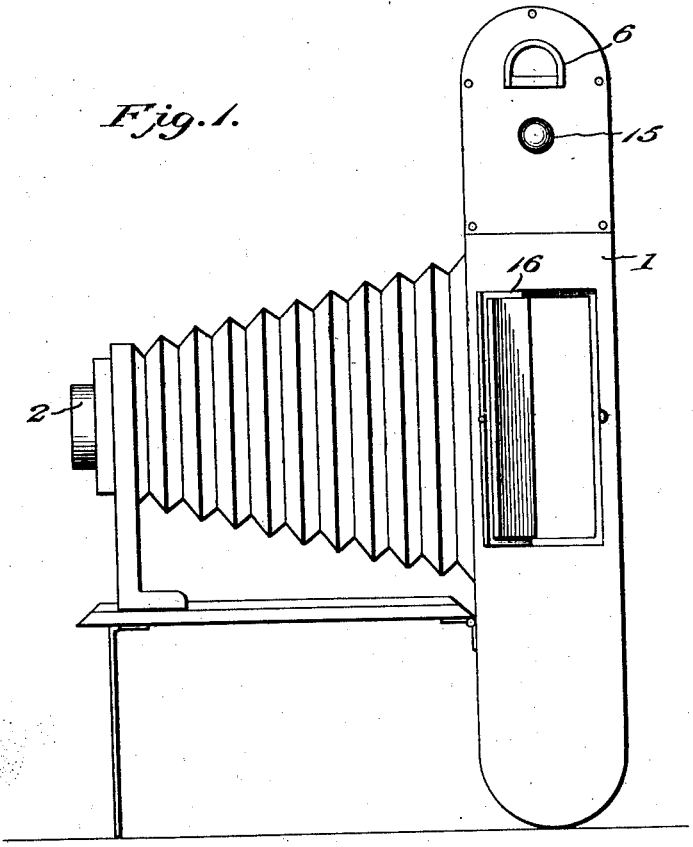
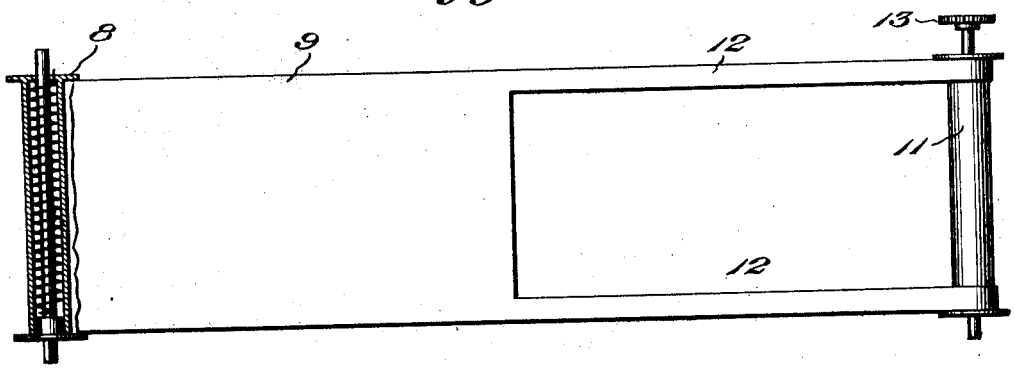

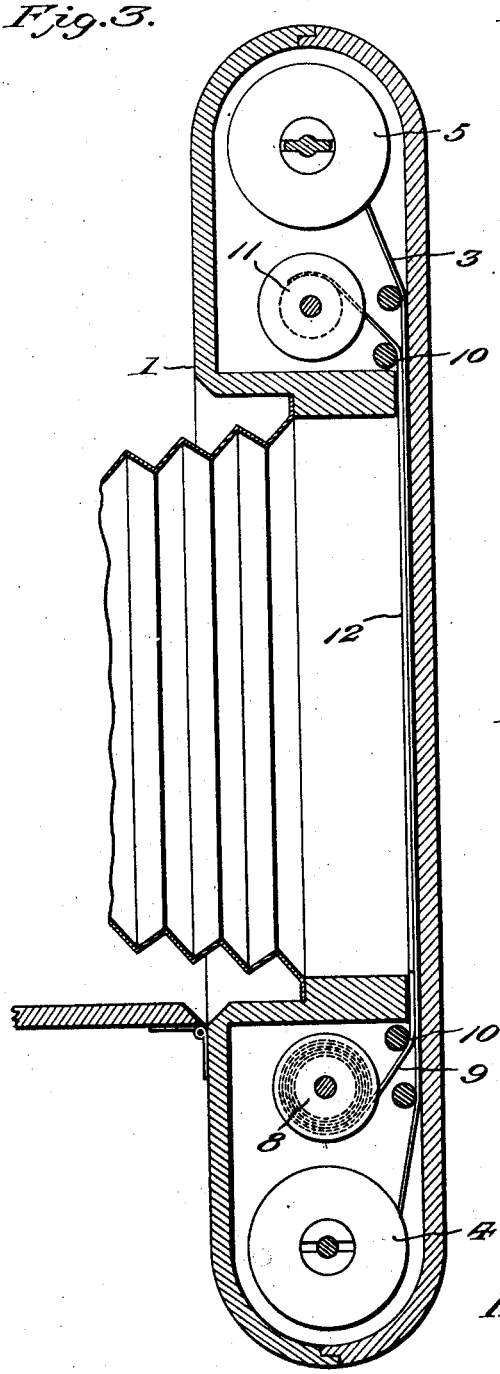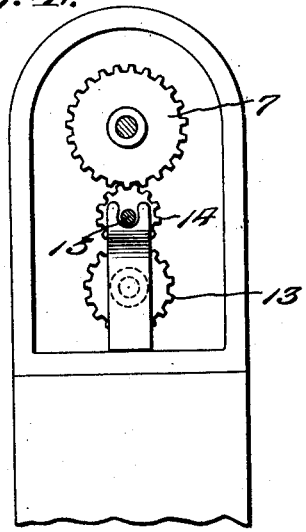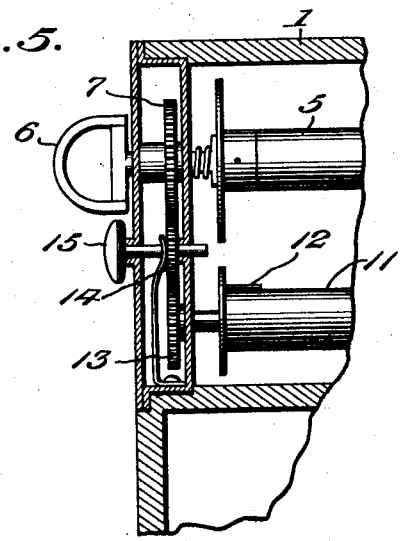

HECTOR J. PERRIER, OF EDMONTON, ALBERTA, CANADA.

CAMERA.

1,346,461.  Specification of Letters Patent.  Patented July 13, 1920.

Application filed August 16, 1918. Serial No. 250,245.

*To all whom it may concern:*

Be it known that I, HECTOR J. PERRIER, a citizen of Canada, residing at Edmonton, in the Province of Alberta and Dominion of Canada, have invented new and useful Improvements in Cameras, of which the following is a specification.

This invention relates to cameras and it consists in the novel features hereinafter described and claimed.

An object of the invention is to provide in a camera means for approximately focusing the lens of the camera with relation to the focal plane of the film prior to an exposure whereby a clear picture may be taken with the camera.

With this object in view the invention includes in combination with a camera having means for moving a film across the focal plane a curtain mounted upon a spring operated roller located within the body of the camera and in advance of the film there being means for drawing the curtain in front of the film and in close proximity to the same so that the view may be produced upon the curtain and the lens may be adjusted to obtain a proper focus and thereby produce a clear picture when the film is exposed.

In the accompanying drawings:—

Figure 1 is a side elevation of the camera;

Fig. 2 is a detail view of the curtain and its appurtenances.

Fig. 3 is a section through the camera, in a plane parallel to Fig. 1.

Figs. 4 and 5 are detail views illustrative of the connection between the rollers 5 and 11.

As illustrated in the accompanying drawings, the camera includes a body 1 of usual configuration and in advance of which is adjustably mounted a lens 2. A film 3 is arranged to move across the focal plane of the body 1 and may unwind from a spool 4 and wind upon a spool 5 in a usual manner. A key 6 is provided upon the shaft of the spool 5 and may be used for turning the said spool. A gear wheel 7 is fixed to the shaft of the spool 5.

A spring actuated roller 8 is journaled in the body 3 and a curtain 9 is arranged to wind upon the roller 8 and unwind therefrom. The intermediate portion of the curtain 9 may be passed around guiding rollers 10 journaled in the body 3. A roller 11 is journaled for rotation in the upper portion of the body 3 and the curtain 9 is provided with tapes or cords 12 which are arranged to wind upon the roller 11 and unwind therefrom. A gear wheel 13 is fixed to the shaft of the roller 11. A gear wheel 14 is fixed to a spring pressed button 15 and when the said button is moved by pressure against the tension of its spring the wheel 14 is moved out of engagement with the wheels 7 and 13. The curtain 9 is opaque and the forward surface of the curtain is preferably a dull gray. The body 3 is provided at its side with a door 16 which may be opened to view the forward surface of the curtain.

When the film is moved across the focal plane the wheel 14 is to be moved into engagement with the wheels 7 and 11 whereby the curtain 9 is also drawn across the focal plane. The lens 2 is then adjusted to properly focus the image upon the gray surface of the curtain 9. When the proper focus is had the door 16 is closed and the wheel 14 is moved out of engagement with the wheels 7 and 11 whereupon the curtain 9 will be rewound upon the roller 8. Consequently when the shutter of the lens mechanism is operated an exposure is had upon the film and a clear cut picture is produced.

From the foregoing description taken in conjunction with the accompanying drawings, it will be seen that a camera of simple and durable structure is provided and that means are included in the camera structure for approximately focusing an image or images upon the focal plane of the film prior to the exposure of the film.

Having described the invention what is claimed is:—

A camera comprising a body having an opening and means to normally close the same, a lens adjustably mounted with relation to the body, means to move a film in the body, a spring-actuated roller journaled in the body, a second roller journaled in the body, means to connect the second-named roller with the film-moving means, said connecting means being capable of ready disconnection from the film-moving means, and an opaque curtain attached to the spring-actuated roller and having an opening and also having a focusing surface visible through the opening in the body.

In testimony whereof I affix my signature.

HECTOR J. PERRIER.